US006570753B2

(12) United States Patent
Bensaoula et al.

(10) Patent No.: US 6,570,753 B2
(45) Date of Patent: May 27, 2003

(54) CAPACITOR AND METHOD OF STORING ENERGY

(75) Inventors: Abdelhak Bensaoula, Houston, TX (US); Nacer Badi, Houston, TX (US)

(73) Assignee: University of Houston, Houston, TX (US)

( * ) Notice: Subject to any disclaimer, the term of this patent is extended or adjusted under 35 U.S.C. 154(b) by 0 days.

(21) Appl. No.: 09/865,767

(22) Filed: May 25, 2001

(65) Prior Publication Data

US 2003/0035261 A1 Feb. 20, 2003

(51) Int. Cl.$^7$ .................................................. H01G 4/06
(52) U.S. Cl. ..................... 361/311; 361/313; 361/306.1; 361/303; 361/606.3
(58) Field of Search ................................. 361/311, 303, 361/306.1, 313, 321.1, 301.4, 305, 312, 306.3, 301.2, 321.4, 320

(56) References Cited

U.S. PATENT DOCUMENTS

| | | | |
|---|---|---|---|
| 4,435,738 A | | 3/1984 | Barber, Jr. et al. |
| 4,562,628 A | | 1/1986 | Marneffe et al. |
| 4,584,074 A | | 4/1986 | Sterling et al. |
| 4,612,689 A | | 9/1986 | de Wild et al. |
| 4,991,055 A | | 2/1991 | Marneffe et al. |
| 5,090,099 A | | 2/1992 | Kim et al. |
| 5,142,350 A | * | 8/1992 | Heremans et al. ............ 357/61 |
| 5,179,773 A | | 1/1993 | Monsees et al. |
| 5,198,721 A | * | 3/1993 | Kahng et al. ................ 313/503 |
| 5,254,360 A | | 10/1993 | Crownover et al. |
| 5,304,274 A | | 4/1994 | Crownover et al. |
| 5,452,178 A | * | 9/1995 | Emesh et al. ................ 361/303 |
| 5,481,428 A | | 1/1996 | Lauf et al. |
| 5,519,087 A | | 5/1996 | Tang |
| 5,668,694 A | | 9/1997 | Sato et al. |
| 5,708,559 A | | 1/1998 | Brabazon et al. |
| 6,107,137 A | | 8/2000 | Fazan et al. |
| 6,144,546 A | * | 11/2000 | Mizushima et al. ......... 361/303 |

OTHER PUBLICATIONS

Tempez, et al., "Photoenhanced reactive ion etching of III–V nitrides in $BCl_3/Cl_2/Ar/N_2$ plasmas," *J. Vac. Sci. Technol. A* 17(4), pp. 2209–2213 (Jul/Aug. 1999).

Medelci, et al., "Reactive Ion Etching of Boron Nitride and Gallium Nitride Materials in $Cl_2/Ar$ and $BCl_3/Cl_2/Ar$ Chemistries," *Mat. Res. Soc. Symp. Proc.*, vol. 512, pp. 285–291 (1998).

Lawless, et al., "Energy Storage at 77K in Multilayer Ceramic Capacitors," IEEE, pp. 672–675 (1996).

Sakabe, et al, "High Frequency Performance of Multilayer Ceramic Capacitors," IEEE, pp. 234–240 (1995).

Burn, Ian, "High Performance Capacitor Dielectrics from Chemically Prepared Powders," IEEE, pp. 397–400 (1996).

Nomura, et al., "Multilayer Ceramic Capacitors—Recent Trends," IEEE, pp. 135–141 (1996).

Pujari, et al., "Effect of Sintering Temperature on NPO, X7R & Z5U MLCC Capacitor," *Materials Science Forum*, vols. 223–224, pp. 283–286 (1996).

Burks, et al., "MLC Capacitors for Switch Mode Power Supply and Related Large Signal Applications," IEEE, pp. 365–372 (1989).

Yoshida, et al., "The Development of High Voltage Power Capacitor Technology in Japan," *IEEE Electrical Insulation Magazine*, vol. 11, No. 1, pp. 32–45, (Jan./Feb. 1995).

* cited by examiner

*Primary Examiner*—Dean A. Reichard
*Assistant Examiner*—Nguyen Ha
(74) *Attorney, Agent, or Firm*—Baker Botts L.L.P.

(57) ABSTRACT

A method for storing energy in a capacitor includes connecting a first conductor to a first electrode. A second conductor is connected to a second electrode. The second electrode is separated from the first electrode by a dielectric layer. The dielectric layer includes a layer of boron nitride, BN. The conductivity of the dielectric layer is lower than the conductivity of the first electrode or the second electrode. A voltage of at least 5 volts is applied between the first electrode and the second electrode. The voltage is applied be means of the first and second conductors.

14 Claims, 12 Drawing Sheets

CAPACITOR AND METHOD OF STORING ENERGY

TECHNICAL FIELD OF THE DISCLOSURE

The present disclosure relates in general to electronic devices, and, more particularly, to a capacitor and a method for storing energy.

BACKGROUND

Capacitors are a critical electronic device found in large numbers in many everyday products. For example, computers, telecommunications equipment, mobile phones, automobiles, and military equipment each make heavy use of state-of-the-art capacitors. Capacitors that are reliable and inexpensive are thus in great demand.

One conventional structure for ceramic capacitors is a structure of multiple layers in which dielectric layers of ceramic are interleaved with conductive electrodes. Every other conductive electrode is electrically connected, resulting in a device having two effective electrodes with a capacitance many times the capacitance of the single dielectric layer. Such multilayer ceramic capacitors (MLCCs) are the most reliable component for high-energy density storage banks. They also find use in high frequency switch mode power supplies, and account for a large part of the capacitor market, as discussed in T. Nomura et al, "Multilayer Ceramic Capacitors—Recent Trends," IEEE, *Ferroelectrics,* 1996, p. 135. One goal of MLCCs is to achieve higher capacitance in combination with a smaller size. The realization of MLCCs with higher capacitance and volumetric efficiencies is today's biggest challenge for MLCC manufacturers. Such MLCCs could be used in the application fields in which electrolytic or plastic film capacitors are currently used.

The main limiting factors for MLCC development are thickness control, the integrity of the dielectric layers and effective electrodes. The primary objectives are smaller case sizes for a given capacitance value, higher reliability and lower cost per unit. The conventional dielectrics that dominate the market are sintering-based NPO, X7R and Z5U. These materials are limited by change in capacitance as a function of temperature and a high rate of aging. Also, large grain size (>3 $\mu$m) of the oxide or perovskite powder limits the thickness of the dielectric layer.

In high C-V/Volume capacitors, use of precious metal and the high layer count increase the cost of the capacitors. One objective is to have lower cost per unit.

Lack of availability of high-temperature, high-power capacitors has been one of the weak links in high temperature electronics. The three type (classes) of existing capacitors can operate properly only within the military range of temperature—up to about 150° C. While several manufacturers offer capacitors designed to meet these specifications, only few offer devices that operate beyond that range. As operating temperature increases, the choices and data become progressively limited. The inventors are not aware of any commercial capacitors specified for use above 300° C.

The equations for a planar capacitor are:

Capacitance (C)=KA/fd (picofarad) and C/Vol Kd$^{-2}$ where, f: conversion factor (metric system: f=11.31: cm).

The energy stored, U, is:

$$U = \frac{CV^2}{2} = \frac{1}{2}\frac{KA}{f}d(E)^2 \quad V = E \cdot d$$

and the energy density stored, $\Delta F$, in a capacitor (potential energy/volume or mass) is:

$$\Delta F = \frac{U}{V_{ol}} = \frac{1}{2}KE^2 \text{ (volume)} = \frac{1}{2}\frac{KE^2}{\rho} \text{ (mass)}$$

where K is the relative dielectric constant of the material, A is the effective area of the internal electrode, d is the thickness of the dielectric layer, and E is the electric field. Parametrically, it is desirable to optimize K, A/d and E simultaneously. Practically, it has been easier to attack the problem from two approaches. The first of these is to engineer dielectric films with high K and E. This work extended the energy density of "conventional" capacitors by an order of magnitude, as discussed in M. F. Rose, Transactions of the IEEE on Magnetics, 22, 1986. The current trend is to optimize the A/d ratio. in the expression for the capacitance. This will result in high energy density at lower voltage.

The parameters of interest for such capacitors include:
Capacitance (C).
Temperature coefficient of capacitance (TCC).
Breakdown voltage (BDV).
Capacitance per unit volume or weight (volumetric or weight efficiency).
Dissipation factor (DF) or loss tangent.
Insulation resistance (IR)
For certain applications, radiation immunity.

The development of compact and miniature power sources that operate over an extended temperature range becomes possible by replacing existing capacitors with high-temperature capacitors. This development can make possible several new heavy-duty devices in the semiconductor industry, the military (e.g., explosives, fuses, safe-arm-fire devices, and explosive detonators), and space (e.g., compact power supplies, solar-powered equipment). High-temperature capacitors are well suited for pulse power applications such as ignition systems, lasers, x-ray generation, power supplies, electric vehicles, solar-powered equipment and physics research. Applications involving compact power density sources operating in harsh environments and compatible with Micro Electro Mechanical Systems (MEMs) are also possible. Compact power density sources also find use in high frequency switch mode power supplies, because they can be optimized to minimize both effective series resistance (ESR) and effective series inductance (ESL).

A capacitor to be used in a semiconductor memory is disclosed in U.S. Pat. No. 6,144,546. A hexagonal boron nitride as a dielectric is disclosed. The capacitor of the '546 patent includes nanoscale (0.5–5 nm thick) layers of conductors or semiconductors so that two-dimensional electrical conduction occurs along the layers, thereby suppressing leakage current. The dielectric layer is also thin for the low voltage (about 2V) applications anticipated in large-scale integrated circuits.

What is needed is a high-temperature capacitor that can achieve high energy density storage, can operate at relatively high voltage with low current leakage and that can be produced at a reasonable cost.

SUMMARY OF THE INVENTION

A capacitor and method of storing energy is disclosed. None of the advantages disclosed, by itself, is critical or necessary to the disclosure.

A method for storing energy in a capacitor is disclosed that includes connecting a first conductor to a first electrode. A second conductor is connected to a second electrode. The second electrode is separated from the first electrode by a dielectric layer. The dielectric layer includes a layer of boron nitride, BN. The conductivity of the dielectric layer is lower than the conductivity of the first electrode or the second electrode. A voltage of at least 5 volts and preferably a voltage of at least 100 volts is applied between the first electrode and the second electrode. The voltage is applied by means of the first and second conductors. In a more specific embodiment, the dielectric layer is separated from one or both the electrodes by a barrier layer. Such a layer can be formed of elemental boron or silicon oxide, $SiO_x$, which includes $SiO_2$. An electronic device for use with the method is also disclosed.

It is a technical advantage of the methods and devices disclosed that stable electrical characteristics can be achieved over a large range of operating temperatures.

Another technical advantage of the methods and devices disclosed is that high energy density can be achieved.

Another technical advantage of the methods and devices disclosed is that a high capacitance per device can be achieved.

Other technical advantages of embodiments of the present disclosure will be readily apparent to one skilled in the art from the following figures, descriptions, and claims. Various embodiments of the invention obtain only a subset of the advantages set forth. No one advantage is critical to the invention. For example, one embodiment of the present invention may provide only the advantage of storing electrical energy, while another embodiment may exhibit only stable electrical characteristics over a large range of temperatures.

BRIEF DESCRIPTION OF THE DRAWINGS

A more complete understanding of the present disclosure and advantages thereof may be acquired by referring to the following description taken in conjunction with the accompanying drawings, in which like reference numbers indicate like features, and wherein.

DETAILED DESCRIPTION OF THE DISCLOSURE

Figure 1:
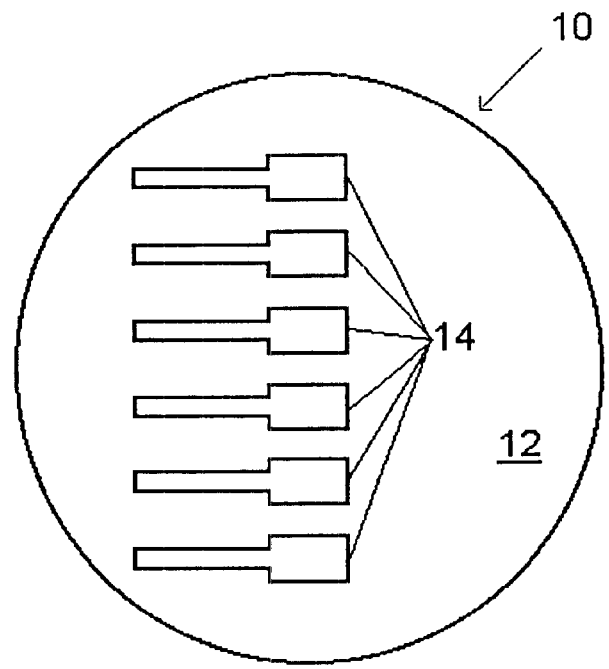
FIG. 1 is a top view of a deposition mask in accordance with one embodiment of the present invention.

FIG. 1 is a top view of a deposition mask in accordance with one embodiment of the present invention. The deposition mask 10 includes a surface 12 that defines apertures 14 therethrough. The surface 12 is formed of a material that blocks deposition when it is placed between the deposition source and the substrate on which the deposition is occurring. The apertures 14 allow particular areas of the substrate to receive deposition. The deposition mask 10 can also be rotated relative to the substrate. Depending upon the characteristics of the apertures 14 such a rotation allows for different particular areas of the substrate to receive deposition using the same deposition mask 10. The apertures 14 in the deposition mask 10 of FIG. 1 are not radially symmetric and therefore expose different areas of the substrate depending upon the rotation of the mask 10. In one embodiment the deposition mask 10 is made of a metal and is mechanically placed and rotated between the deposition source and the substrate.

Figure 2:
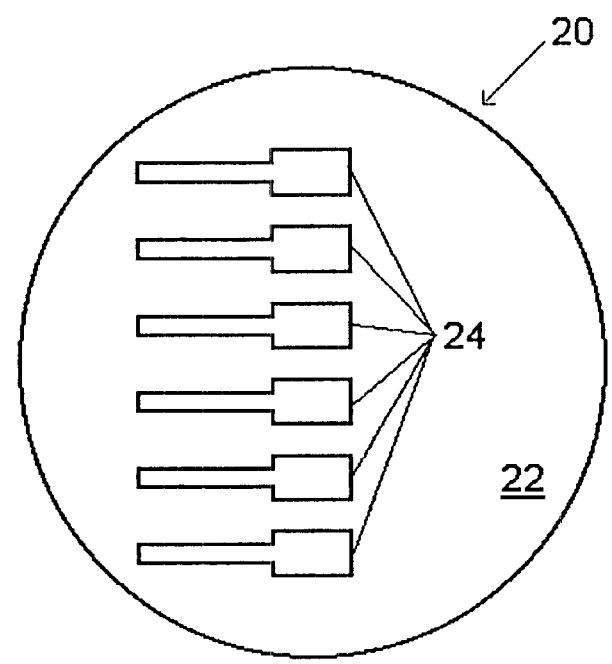
FIG. 2 is a top view of a substrate during the deposition of electronic devices in accordance with one embodiment of the present invention.

FIG. 2 is a top view of a substrate during the deposition of electronic devices in accordance with one embodiment of the present invention. The substrate 20 in one embodiment is a silicon wafer with a surface 22 facing the deposition source. Electrodes 24 are formed by deposition of a conductive material through the mask 10. In one embodiment the conductive material is aluminum and the electrodes have a thickness of approximately 300 angstroms (Å). In another embodiment, the conductive material may be tantalum nitride, TaN. In another embodiment, the conductive material may be titanium nitride, TiN. Many other conductive materials suitable for electrodes are known to those in the art.

Figure 3:
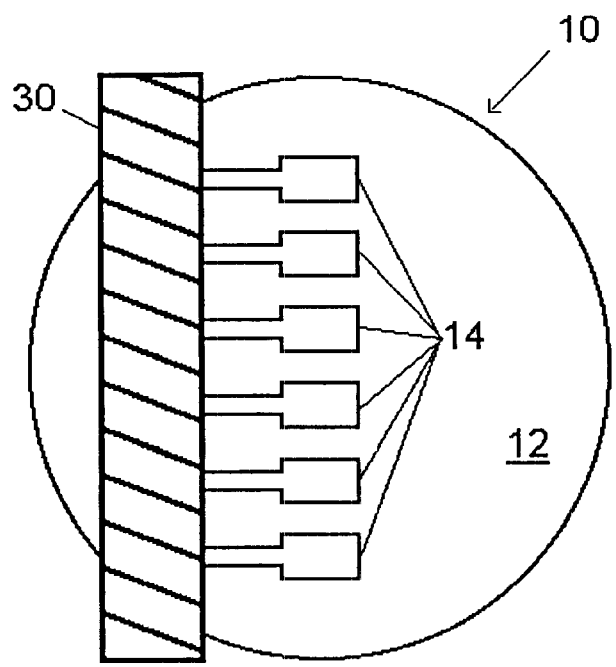
FIG. 3 is a top view of a deposition mask in accordance with one embodiment of the present invention.

FIG. 3 is a top view after metal deposition illustrated in FIG. 2 and placement of shadow bar 30, in accordance with one embodiment of the present invention. Portions of the metal electrodes 14 are blocked by a shadow bar 30. The shadow bar 30 reduces the areas to which the deposition of dielectric or barrier layer will occur. In another embodiment, the shadow bar 30 could be used without the deposition mask 10 or the shadow bar 30 does not apply.

Figure 4:
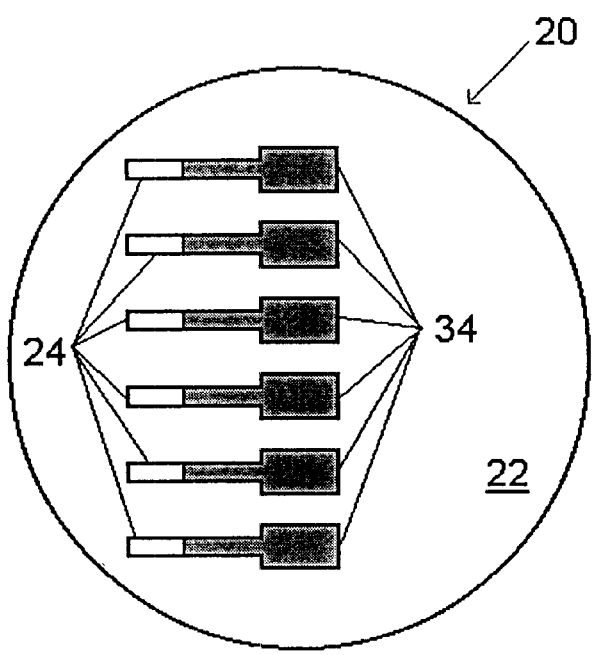
FIG. 4 is a top view of a substrate during the deposition of electronic devices in accordance with one embodiment of the present invention.

FIG. 4 is a top view of a substrate during the deposition of electronic devices in accordance with one embodiment of the present invention. One portion of the electrodes 24 is covered by the shadow bar 30. Deposition of a barrier layer, a dielectric layer, and a second barrier layer 34 occurs with the shadow bar 30 preventing total coverage of the electrodes 24. Deposited layers may occur in between second barrier layer 34. In one embodiment, the barrier layers are silicon dioxide, $SiO_2$, and are in the range of 2000 Å thick. Plasma enhanced chemical vapor deposition (CVD) at 200° C. can be used to deposit the barrier layers. In another embodiment, the barriers layers are boron, B. Other barrier layers are known to those of skill in the art. In an alternate embodiment, the dielectric layer is deposited directly on the electrodes 24 without either of the barrier layers. When the material of the electrodes 24 and the material of the dielectric layer are within a certain proximity, some materials will experience changes in their electrical characteristics. Preventing deleterious changes in electrical characteristics can be a reason for including barrier layers, depending upon the materials being used. For example, with aluminum electrodes and a BN dielectric layer, a barrier layer at least 1000 Å thick is used to preserve the electrical characteristics of the aluminum and BN.

In $Al/SiO_x/BN/SiO_x/Al$ structures, $SiO_x$ layers are essentially present as diffusion barriers only and do not contribute significantly to the electrical measurements of capacitance. $SiO_x$ layers are not acting as dielectric layers and are not affecting the dielectric of the single BN-based capacitor. Electrical measurements show that the embedded boron nitride (BN) layer is the only effective dielectric.

Estimation of the dielectric constant (K) of the BN layers from experimental measurement of the capacitor in the $Al/SiO_x/BN/SiO_x/Al$ structure gives a value of ~4.0.

The dielectric layer includes a BN layer. The BN layer is formed by PVD at 350° C. from sources of boron and nitrogen. In a more specific embodiment, the BN layer has a crystal structure that includes at least 3% cubic phase. Boron nitride can also have a hex crystal structure or an amorphous crystal structure. One method of depositing BN with at least 3% cubic phase is to use a nitrogen source that releases excited nitrogen. Including at least a small amount, 3%, of cubic phase BN results in a BN layer having desired characteristics such as high thermal conductivity to reduce energy losses and increased hardness. One method of depositing the dielectric layer includes using a boron deposition rate of 0.2 Å/s or less. With particularly advantageous rates being below 0.1 Å/s.

Figure 5:
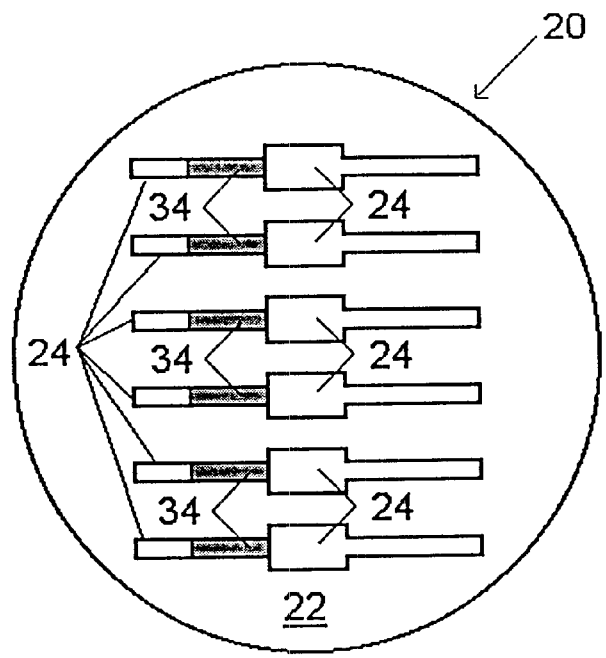
FIG. 5 is a top view of a substrate during the deposition of electronic devices in accordance with one embodiment of the present invention.

FIG. 5 is a top view of a substrate during the deposition of electronic devices in accordance with one embodiment of the present invention. The partially formed devices of FIG. 4 have been supplemented by the addition of new electrodes 24 deposited using the deposition mask 10 rotated 180° from the position in which the first electrodes 24 were deposited. The overlap of the electrodes 24 in the center of each device is separated by the barrier-dielectric-barrier layers 34 previously deposited. The second electrodes for each device can be formed of the same conductive material as the first electrodes or a different conductive material. Two example materials are Al and TaN, but others are known to those of skill in the art. The second electrodes can be deposited to a thickness of 300 Å by PVD from an Al source.

Figure 6:
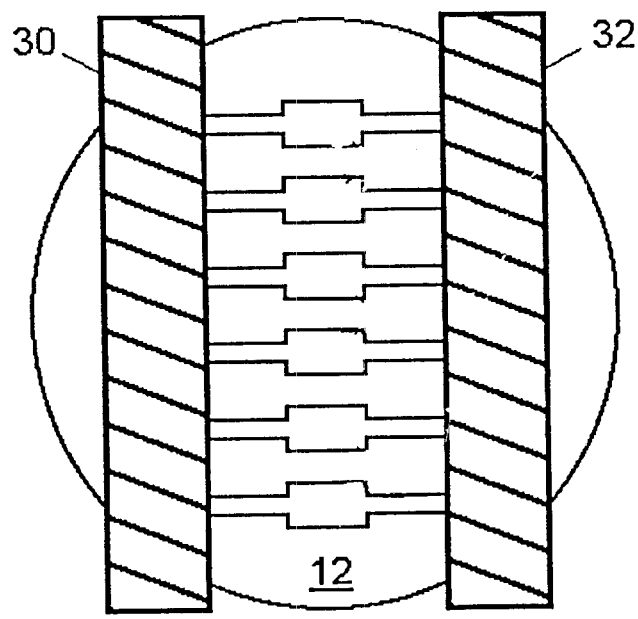
FIG. 6 is a top view showing shadow blocks in accordance with one embodiment of the present invention.
Figure 7:
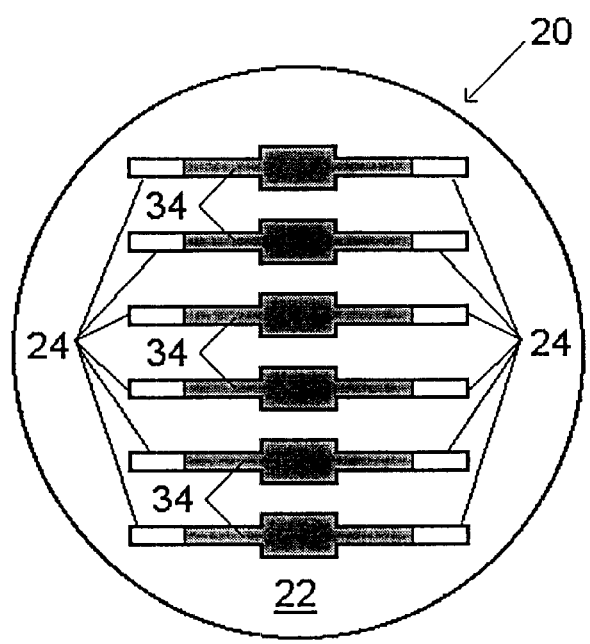
FIG. 7 is a top view of a substrate during the deposition of electronic devices in accordance with one embodiment of the present invention.

FIG. 6 is a top view of a shadow mask in accordance with one embodiment of the present invention. A first shadow block 30 and a second shadow block 32 reduce the areas on which the deposition will occur. In another embodiment, the shadow blocks 30 and 32 do not apply FIG. 7 is a top view of a substrate during the deposition of electronic devices in accordance with one embodiment of the present invention. A barrier layer, a dielectric layer, and a second barrier layer 34 are then deposited. The first and second electrodes 24 are left uncovered. The alternate embodiments of the barrier layers and dielectric layer are discussed in detail with FIG. 4. Once the device has reached the state shown in FIG. 7, additional electrodes can be added by varying the orientation of each electrode and including at least a dielectric layer and, in some embodiments, barrier layers between each electrode layer. In one embodiment, only two electrodes, oriented in opposite directions, are deposited on each device. In another embodiment, hundreds of electrodes are deposited, each oppositely oriented from the previous and next, on each device. The deposition mask 10 and devices shown in FIGS. 1–7 allow subsequent electrodes deposited with the same orientation to be in contact. In an alternate embodiment, the dielectric layers can be deposited to cover the entirety of the electrodes.

Figure 8:
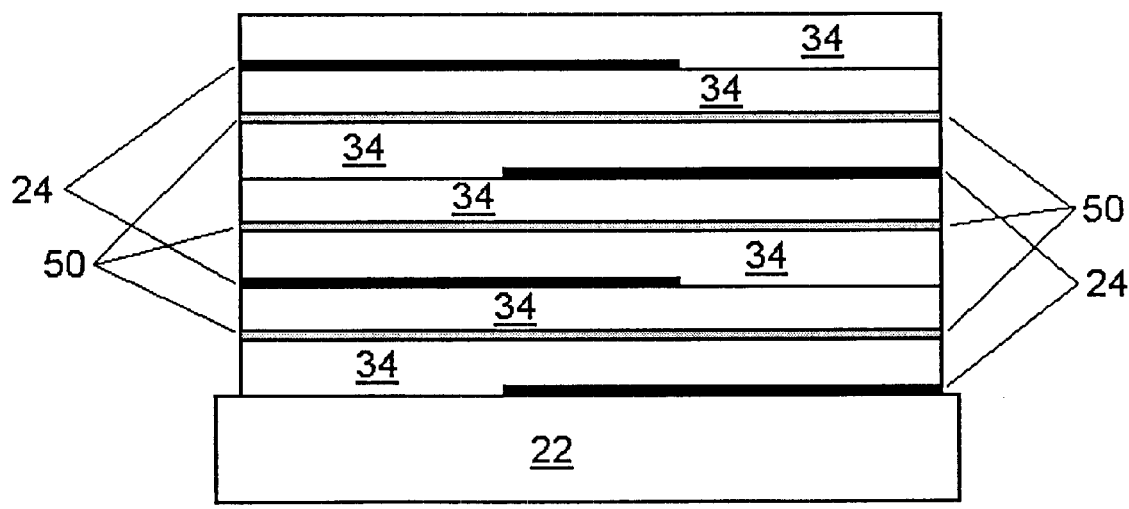
FIG. 8 is a cross-sectional view of an electronic device in accordance with one embodiment of the present invention.

FIG. 8 is a cross-sectional view of an electronic device in accordance with one embodiment of the present invention. In this device the electrodes 24 that extend to each side are not in contact with each other as a result of the manufacturing process. For example, the dielectric and barrier layers may have completely covered the electrodes or the portions of the device where the electrodes were in contact were cut away. The cross-sectional view shows the dielectric layers 50 sandwiched between barrier layers 34. Each barrier-dielectric-barrier sandwich divides oppositely oriented electrodes 24. While only two electrodes of each orientation are shown for ease of illustration, hundreds of layers can be used. In one embodiment, 240 dielectric layers are used to separate the electrodes.

Figure 9:
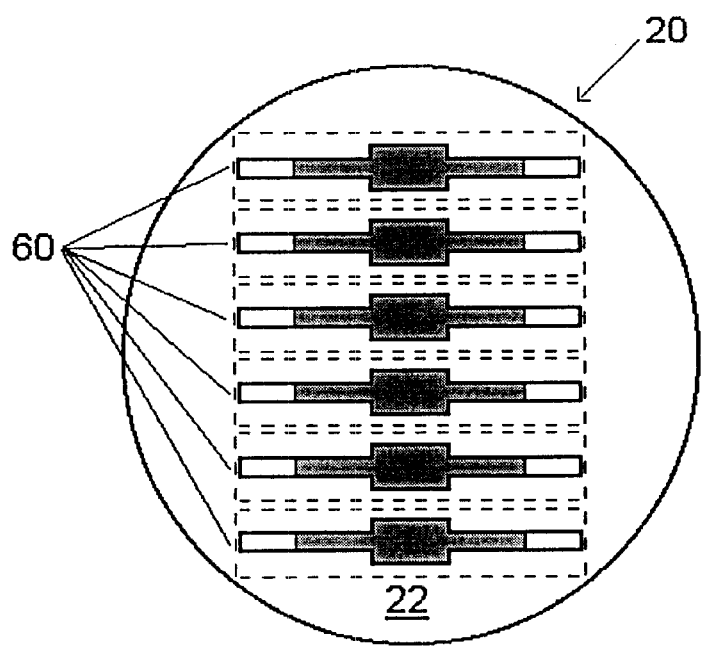
FIG. 9 is a top view of a substrate supporting several electronic devices in accordance with one embodiment of the present invention.

FIG. 9 is a top view of a substrate supporting several electronic devices in accordance with one embodiment of the present invention. The silicon wafer 20 is diced into individual substrates 60. Each individual substrate 60 contains a capacitor. In order to store energy on the capacitor, conductive leads need to be connected to each end of the capacitor.

Figure 10:
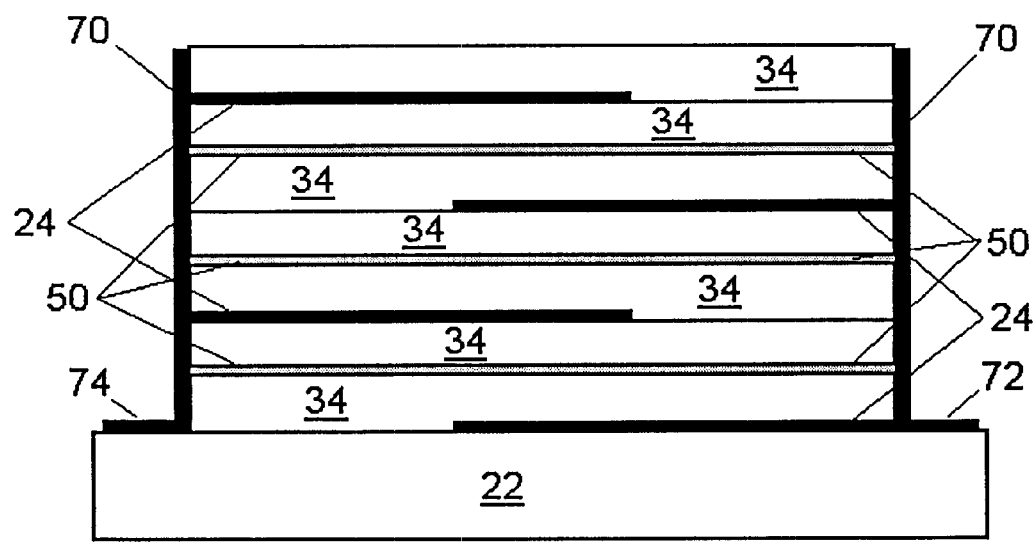
FIG. 10 is a cross-sectional view of an electronic device configured to store energy in accordance with one embodiment of the present invention.

FIG. 10 is a cross-sectional view of an electronic device configured to store energy in accordance with one embodiment of the present invention. The device in FIG. 8 is shown with conductors 70 attached to each of the electrodes 24 extending to one edge of the device. A first lead 72 is conductively coupled to the electrodes 24 that extend to the first side of the device. A second lead 74 is conductively coupled to the electrodes 24 that extend to the second side of the device. The first and second leads 72, 74 are also conductors. A capacitor is a two terminal device with the leads 72, 74 acting as the terminals for connection to an electrical or electronic circuit. In an alternate embodiment, one of the conductors can be connected to a lead placed on the top of the device, above the top barrier layer 34. The other lead remains on the substrate 22. Other placement schemes for the conductive paths to the capacitor terminals are known to those of skill in the art and can be used herein.

Figure 11:
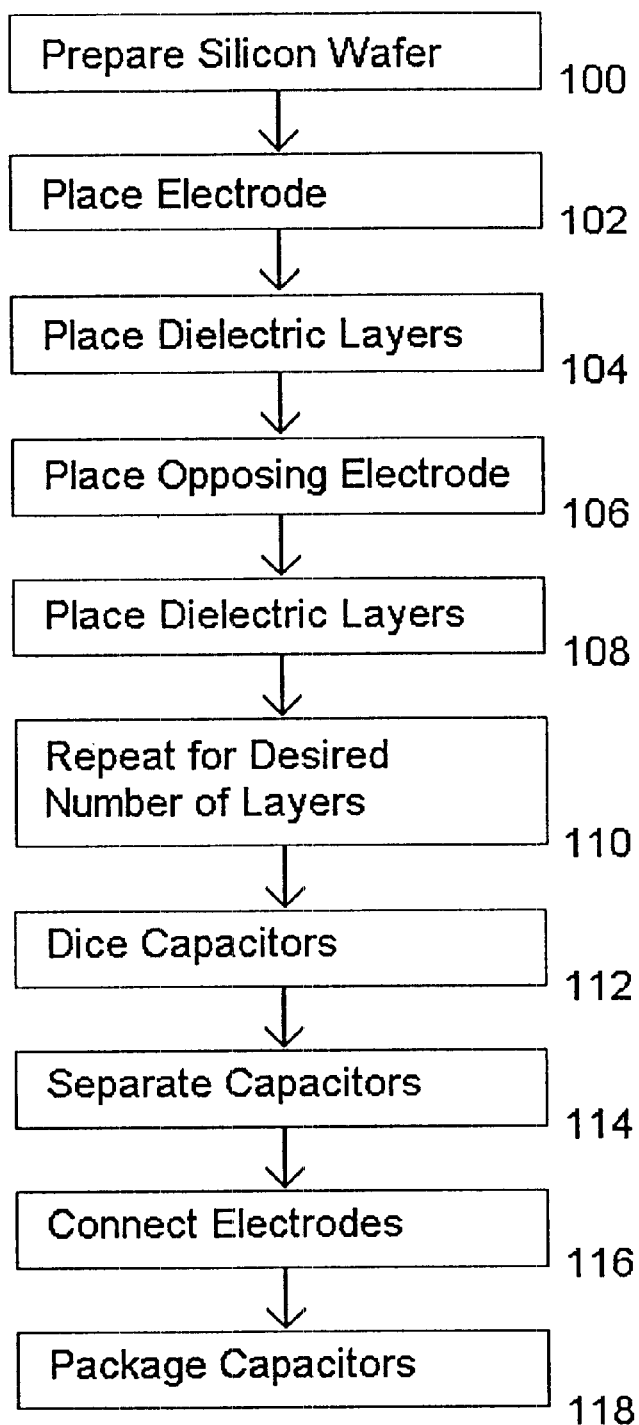
FIG. 11 is a flow diagram of a method for manufacturing capacitors in accordance with one embodiment of the present invention.

FIG. 11 is a flow diagram of a method for manufacturing capacitors in accordance with one embodiment of the present invention. The first step 100 is preparing a silicon wafer for deposition. The first step 100 is explained in more detail in FIG. 12. The second step 102 is placing an electrode. As described with respect to FIG. 2, PVD and a mask can be used to place conductive material on the silicon wafer to form an electrode. The third step 104 is placing the dielectric layers. The placement of dielectric layers is discussed in more detail in FIG. 13. The fourth step 106 is placing the opposing electrode. As described with respect to FIG. 5, a rotated mask can be used with PVD to place the electrode. In an alternate embodiment, the second electrode is placed in the same orientation as the first electrode, but the first and second electrodes are not conductively coupled. The fifth step 108 repeats the third step 104. The sixth step 110 comprises additional series of steps 102 through 108 for the number of layers desired. The seventh step 112 is dicing the wafer into separate substrates, each containing one capacitor. The eighth step 114 is separating the diced separate substrates from each other. In an alternate embodiment, the seventh step 112 and eighth step 114 are unnecessary, because only one capacitor has been placed on the wafer. The ninth step 116, which is performed on the individual capacitors, is connecting the electrodes to two conductors. The final step 118 is packaging the capacitors.

Figure 12:
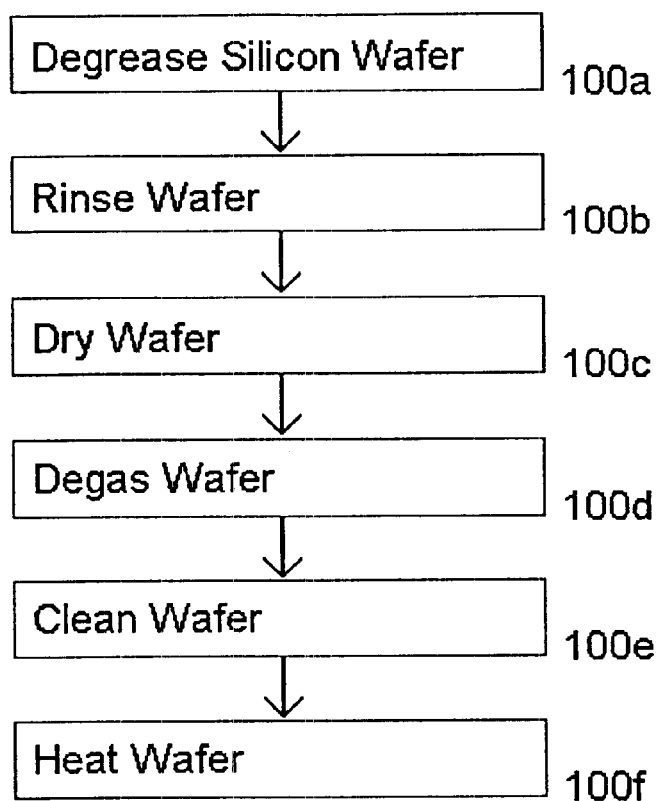
FIG. 12 is a flow diagram of a portion of a method for manufacturing capacitors in accordance with one embodiment of the present invention.

FIG. 12 is a flow diagram of a portion of a method for manufacturing capacitors in accordance with one embodiment of the present invention. The step of preparing the wafer 100, shown in FIG. 11, itself comprises several steps. The first step 100a is degreasing the silicon wafer. Conventional solvents are used in the degreasing step 100a. The second step 100b is rinsing the wafer. In on embodiment, the wafer is rinsed in de-ionized water for consistent electrical characteristics. The third step 100c is drying the wafer. In one embodiment the wafer is dried with nitrogen gas $N_2$. The fourth step 100d is degassing the wafer. In one embodiment, the wafer is degassed in the deposition chamber at 850° C. for 15 minutes at a pressure of $10^{-8}$ torr. Depending on the reactor design and pumping speed, higher or lower vacuum levels may be used. The fifth step 100e is cleaning the wafer. One method of cleaning the wafer is to bombard the wafer with argon for 10 minutes. The final preparatory step 100f is heating the wafer to the temperature at which deposition will occur. The temperature can vary and in one embodiment is in the range of 80–600° C.

Figure 13:
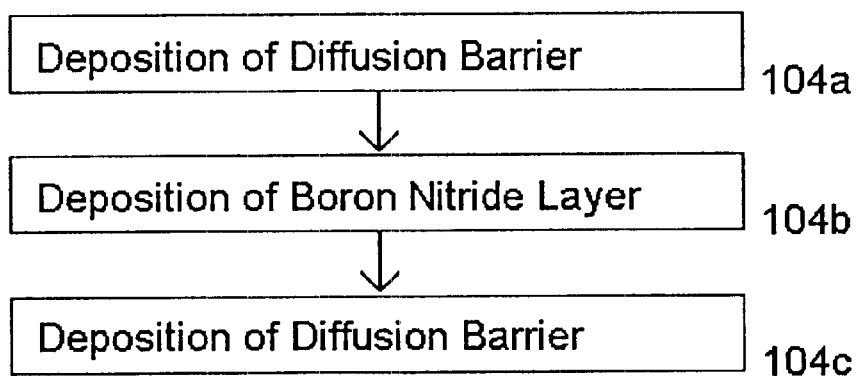
FIG. 13 is a flow diagram of a portion of a method for manufacturing capacitors in accordance with one embodiment of the present invention.

FIG. 13 is a flow diagram of a portion of a method for manufacturing capacitors in accordance with one embodiment of the present invention. The step of placing the dielectric 104 and 108, shown in FIG. 11, itself comprises several steps. The dielectric layer in one embodiment is a sandwich of diffusion barrier surrounding a boron nitride layer. The method for placing the sandwich includes deposition of a first diffusion layer 104a, deposition of a boron nitride layer 104b, and deposition of a second diffusion layer 104c. The manner of deposition of the particular layers is discussed with reference to FIG. 4.

Figure 14:
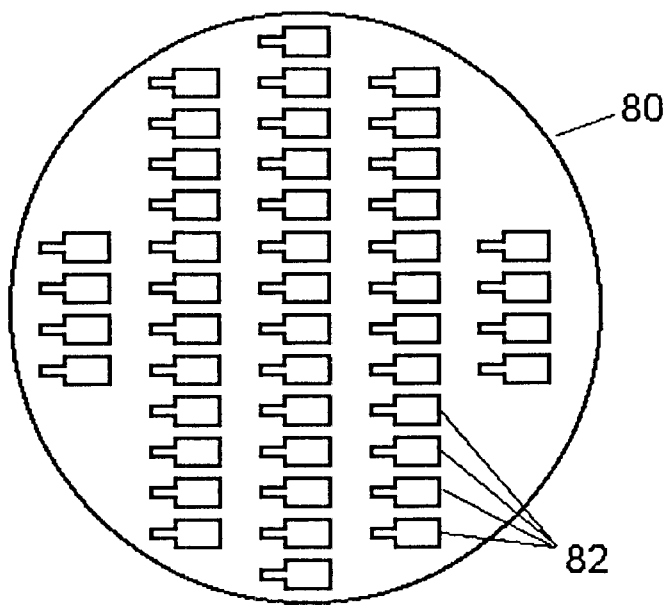
FIG. 14 is a top view of a deposition mask in accordance with one embodiment of the present invention.

FIG. 14 is a top view of a deposition mask in accordance with one embodiment of the present invention. In order to store sufficient energy, the capacitors should have an area greater than 1 $\mu m^2$, and preferably greater than 5 $\mu m^2$. For an 8 inch silicon wafer thousands of capacitors can be produced at once. Another embodiment of the invention involves using a mask 80 with a large number of apertures 82 to guide deposition of capacitor layers. For ease of illustration, FIG. 14 does not illustrate the actual number of apertures needed for capacitors having dimensions on the order of a millimeter being grown on a wafer having a diameter on the order of ten inches. The mask 80 is not used in conjunction with shade blocks such as those shown in FIGS. 3 and 6. Instead, the barrier and dielectric layers are grown over the entire surface of the wafer. Only the electrodes are deposited through the mask 80.

Figure 15:
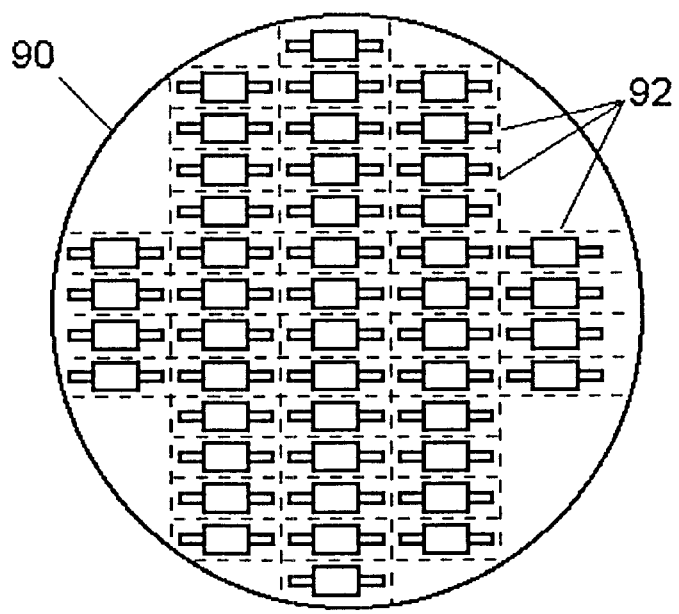
FIG. 15 is a top view of a substrate supporting several electronic devices in accordance with one embodiment of the present invention.

FIG. 15 is a top view of a substrate supporting several electronic devices in accordance with one embodiment of the present invention. FIG. 15 shows a silicon wafer 90 bearing the capacitors 92 that result from depositing electrodes using the mask 80 and depositing barrier and dielectric layers over the entire surface of the wafer. As with FIGS. 1–7, repeated sets of opposing electrodes with intervening layers can be grown to increase the capacitance. The dotted lines show the dicing of the individual substrates.

EXAMPLE 1

Based on the capacitance measurement of a single BN-based capacitor, one can estimate the value for multilayer capacitors and compare it with values for multilayer capacitors based on sintering technology.

Y7R-designated 6.8 $\mu F$ MLCCs @ 1 KHz with 240 dielectric layers 3.2 $\mu m$ thick each were successfully fabricated in EIA 1206 size (3.2 mm×1.6 mm×1.5 mm) using a relaxor dielectric ceramic (PBZT).

Using the same electrode area (3.2 mm×1.6 mm), the same layer counts (240), and a range of values of thickness of each dielectric and diffusion barrier, the capacitance for different values of BN thickness and the energy density ratio as compared to sintering capacitors are listed in Table I.

Energy stored in a capacitor $$U = \frac{CV^2}{2} \quad V: \text{voltage}$$

According to the equation of capacitors:

$$C_1(\mu F) = 434 \times 1/d \text{ d (Angstrom): BN thickness layer}$$

The energy density stored in a capacitor is the energy/volume

The energy density ratio calculated at the same rating voltage is:

$$\delta = \frac{C_1/VL_1}{C_2/VL_2} = \frac{C_1}{C_2} \times \frac{VL_2}{VL_1}$$

$C_1$, $VL_1$: capacitance and volume of a BN dielectric layer $C_2$, $VL_2$: capacitance and volume of a Y7R-PBZT dielectric layer $C_2=6.8$ $\mu F$, $V_2=3.2$ mm×1.6 mm×1.5 mm; $V_1=3.2$ mm×1.6 mm×($d_1+d_2+d_3$)

$d_1$: BN layers total thickness $d_2$: Total thickness of the diffusion barrier layers $d_3$: Total thickness of the metal electrode layers

TABLE I

| BN dielectric Thickness (Å) | Total BN dielectric Thickness ($d_1$) ($\mu m$) | Capacitance ($C_1$) ($\mu F$) | Energy density ratio* δ | | |
|---|---|---|---|---|---|
| | | | I | II | III |
| 100 | 2.4 | 4.34 | 18.9 | 30.6 | 79.5 |
| 200 | 4.8 | 2.17 | 9.0 | 14.2 | 33.1 |
| 300 | 7.2 | 1.44 | 5.7 | 8.8 | 18.9 |
| 400 | 9.6 | 1.08 | 4.1 | 6.2 | 12.4 |
| 500 | 12 | 0.87 | 3.2 | 4.7 | 8.9 |
| 600 | 14.4 | 0.72 | 2.5 | 3.7 | 6.6 |
| 700 | 16.8 | 0.62 | 2.1 | 3.0 | 5.2 |

TABLE I-continued

| BN dielectric Thickness (Å) | Total BN dielectric Thickness ($d_1$) (µm) | Capacitance ($C_1$) (µF) | Energy density ratio* δ | | |
|---|---|---|---|---|---|
| | | | I | II | III |
| 800 | 19.2 | 0.54 | 1.8 | 2.5 | 4.1 |
| 900 | 21.6 | 0.48 | 1.5 | 2.1 | 3.4 |
| 1000 | 24.0 | 0.43 | 1.3 | 1.8 | 2.8 |

Figure 16:
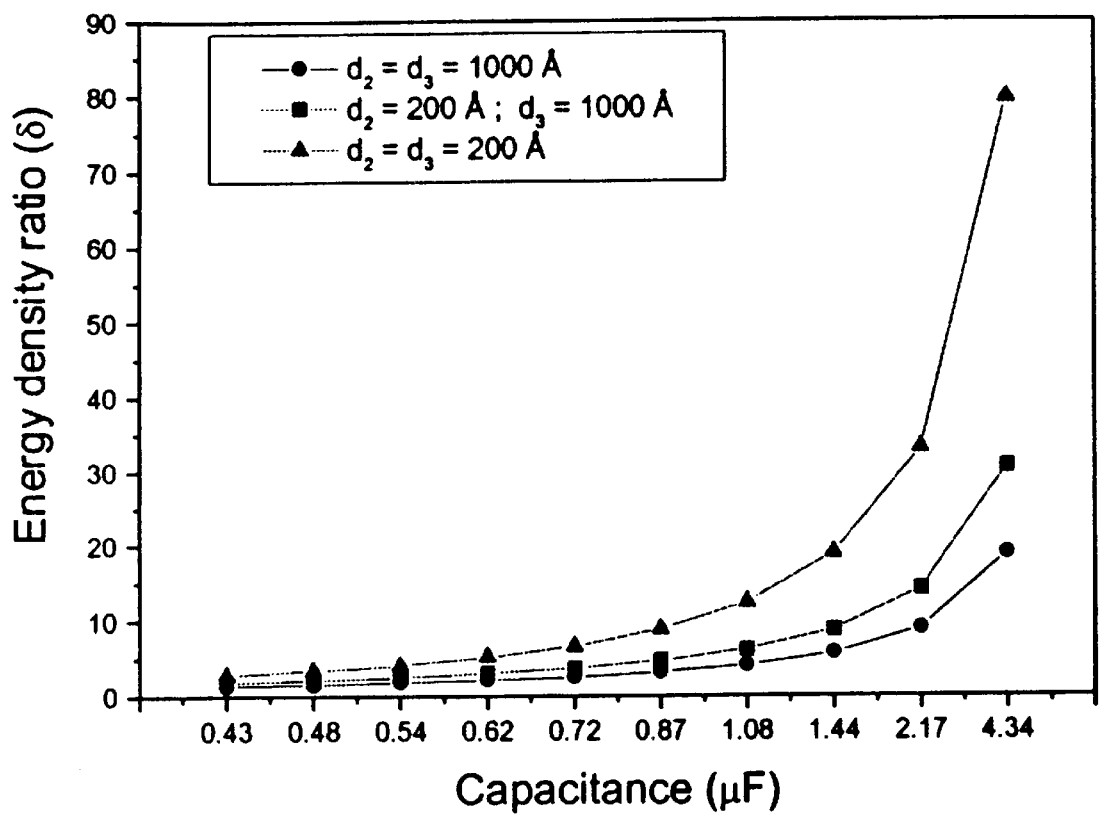
FIG. 16 is a graph showing the energy density ratio between BN and PBZT (Y7R).

*At the same rating voltage, the ratios of the energy density for a BN-based capacitor and a PBZT (Y7R) capacitor for various values of capacitance are shown in FIG. 16. The three curves represent ratio for the three values of total thickness of diffusion barrier layers and total thickness of metal electrode layers shown below.

Figure 17:
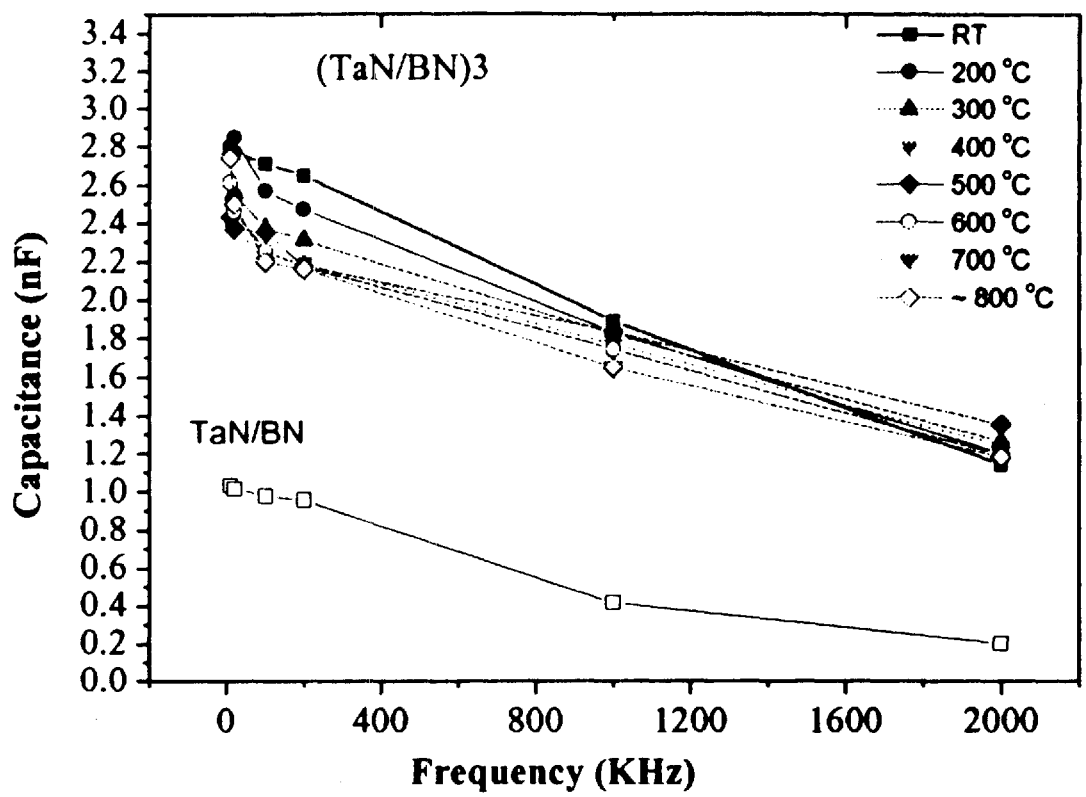
FIG. 17 is a graph showing thermal-frequency behavior of BN-TaN-based capacitors.

I:        $d_2$ = 1000 Å × 241 layers = 24.1 µm
         $d_3$ = 1000 Å × 241 layers = 24.1 µm
II:      $d_2$ = 200 Å × 241 layers = 4.82 µm
         $d_3$ = 1000 Å × 241 layers = 24.1 µm
III:     $d_2$ = 200 Å × 241 layers = 4.82 µm
         $d_3$ = 200 Å × 241 layers = 4.82 µm Single and multilayer capacitor structures were demonstrated by making and testing a stack of three-layer capacitors (TaN/SiO$_2$/BN/SiO$_2$/TaN)$_3$/Si. The measured capacitance values at 10 KHz for 1-layer and 3-layers were 1.01 nF and 2.8 nF, respectively (FIG. 17). This MLCC operated up to 800° C. The percentage change of capacitance with the temperature is about 10% within the same range of 800° C. The dissipation factor is less than 2%.

Figure 18:
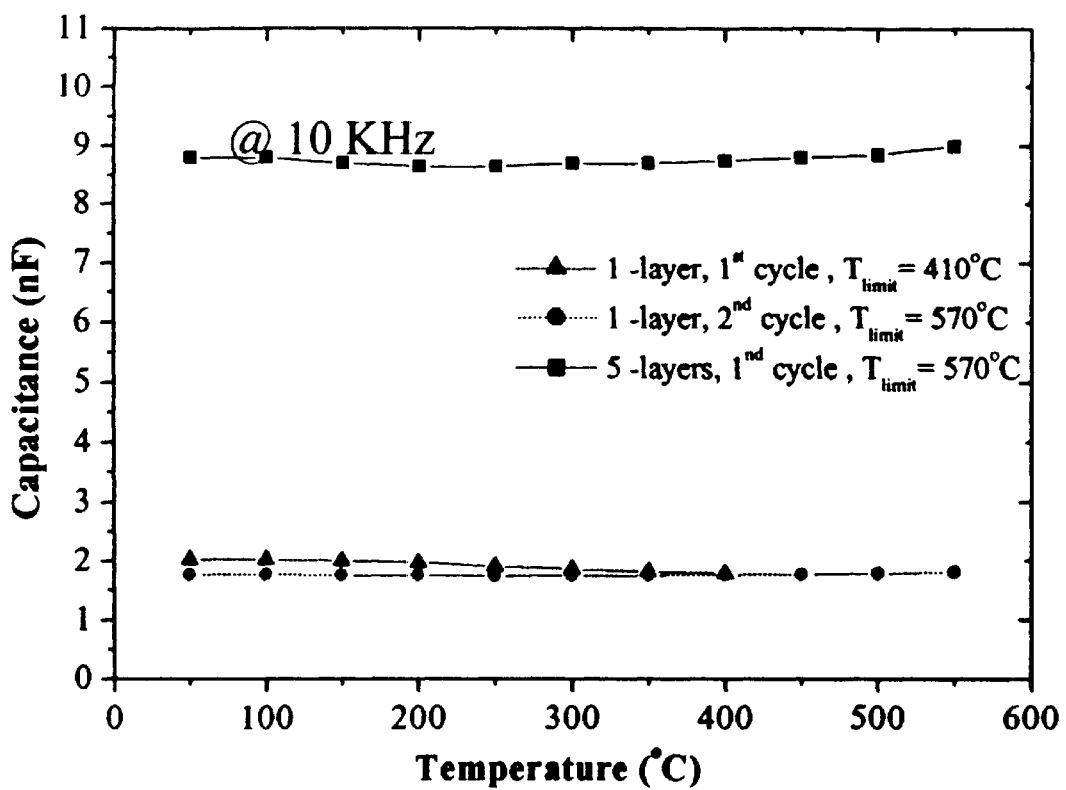
FIG. 18 is a graph showing the thermal behavior of BN-aluminum-based capacitors.

A five-layer capacitor structure using aluminum electrodes has been tested. The capacitance variation with frequency was very smooth up to 2 MHz. The capacitance value at 10 KHz was 8.5 nF for a BN thickness of a few hundred Å (FIG. 18). Aluminum electrodes gave higher capacitance values compared to tantalum nitride-based capacitors. This MLCC operated up to 550° C. The percentage change of capacitance was less than 5% within the same temperature range.

At the macroscale geometry a BN capacitor, mechanical defects (pinholes, grain boundaries . . . ) in advanced ceramics such as BN are normally present. Having these mechanical defects will hinder severely the electrical properties of the device through metal diffusion. The single capacitor and therefore the MLCC electrodes will be shorted through huge transverse leakage (electrode diffusion). Furthermore, it is well known that diffusion increases with ambient temperature. Data show that at the microscale area the BN layers are smooth at the nanoscale (<1 nm rms roughness for a 1×1 micron square) level and pinhole free.

Data also show that a minimum diffusion barrier thickness is required to prevent electrode diffusion to reach the dielectric layer. Using a 10 nm SiO$_2$ diffusion barrier will not work for the BN capacitors disclosed herein. For instance, in the case of the TiN/B/BN/B/TiN/Si (3 mm×4 mm), a boron layer of a minimum thickness of 100 nm is needed at room temperature (RT) for normal operating capacitor. However, at least 200 nm boron layer is needed for a capacitor operating up to 500° C. By normal operating capacitor, we mean that the rating breakdown voltage is a least 100 V. If the thickness is less that 100 nm the result is devices with a near-shorted capacitor.

In the case of Al/SiO$_2$/BN/SiO$_2$/Al/Si and TaN/SiO$_2$/BN/SiO$_2$/TaN/Si capacitors, minimum SiO$_2$ thicknesses of 150 nm and 100 nm, respectively, were necessary to achieve the same results. A thicker SiO$_2$ layer (~1000 nm) is not effective against copper (Cu) diffusion. If copper electrodes are needed, it is recommended to intercalate TaN material between the copper and SiO$_2$.

Figure 19:
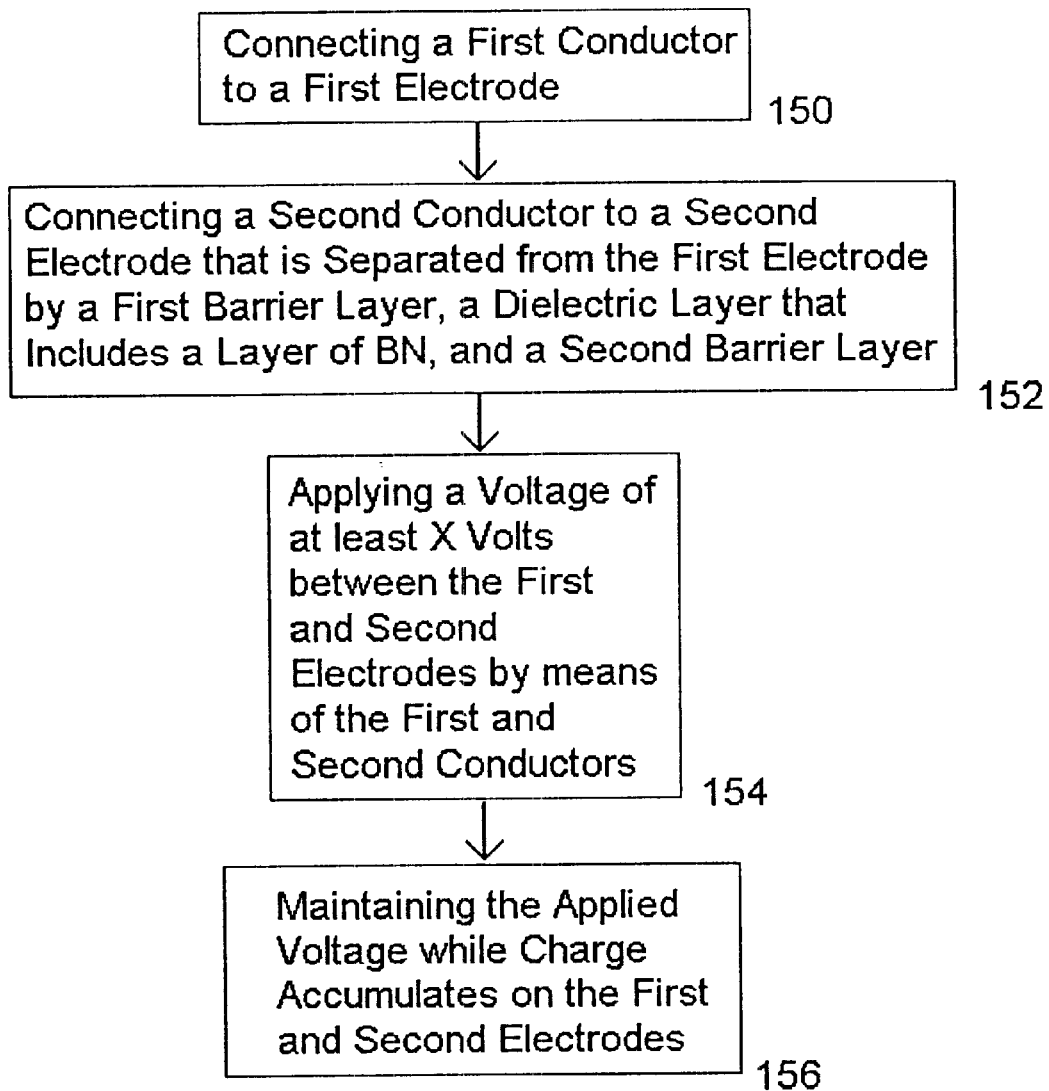
FIG. 19 is a flow diagram of a method for storing energy in an electronic device in accordance with one embodiment of the present invention.

FIG. 19 is a flow diagram of a method for storing energy in an electronic device in accordance with one embodiment of the present invention. The first step 150 is connecting a first conductor to a first electrode of the device. The second step 152 is connecting a second conductor to a second electrode that is separated from the first electrode by a barrier layer, a BN dielectric layer, and a second barrier layer. Alternate embodiments do not includes the barrier layers between the electrodes. The third step 154 is applying a voltage of at least about 5 volts between the first and second electrodes by means of the first and second conductors. In response to maintaining the voltage 156, charge accumulates on the first and second electrodes. A voltage of about 5 volts is necessary to store a useful amount of energy in the device.

Although the present disclosure has been described in detail, it should be understood that various changes, substitutions and alterations can be made thereto without departing from the spirit and scope of the invention as defined by the appended claims.

What is claimed is:

1. An electronic device, comprising:
    a pair of electrically connected electrodes consisting of a first and a second electrode;
    a layer of boron nitride disposed between the first electrode and the second electrode, wherein the first and second electrodes are formed of a material with greater conductivity than the boron nitride layer; and
    diffusion barrier layers having a thickness sufficient to prevent diffusion between the electrodes and the boron nitride layer disposed between the boron nitride layer and the first and second electrodes.

2. The device of claim 1, wherein the diffusion barrier layers comprise SiOx.

3. The device of claim 1, wherein the diffusion barrier layers comprise boron.

4. The device of claim 1, further comprising:
    a plurality of pairs of electrodes, each pair being separated by a layer of boron nitride and having diffusion barrier layers disposed between the boron nitride layers and the pairs of electrodes.

5. An electronic device, comprising:
    a first electrode; and
    a first dielectric layer positioned between the first electrode and a second electrode, the
    first dielectric layer comprising a layer of boron nitride,
    wherein the first electrode is formed of a material with greater conductivity than the first
    dielectric layer, the second electrode is formed of a material with greater conductivity
    than the first dielectric layer, and the area of the first dielectric layer is greater than 1 µm$^2$.

6. The device of claim 5, further comprising:
    a first barrier layer positioned between the first electrode and the first dielectric layer.

7. The device of claim 6, wherein the first barrier layer comprises SiO$_2$.

8. The device of claim 6, wherein the first barrier layer comprises boron.

9. The device of claim 5, further comprising:
    a plurality of barrier layers, each electrode separated from the first dielectric layer by at least one barrier layer.

10. The device of claim 5, further comprising a third electrode conductively coupled to the first electrode;

a second dielectric layer positioned between the third electrode and a second electrode, the second dielectric layer comprising a layer of boron nitride;

a fourth electrode conductively coupled to the second electrode; and a third dielectric layer positioned between the fourth electrode and the third electrode, the third dielectric layer comprising boron nitride.

11. The device of claim 10, further comprising a plurality of barrier layers, each electrode separated from each dielectric layer by at least one barrier layer.

12. The device of claim 5, wherein the first dielectric layer comprises a layer of boron nitride having a crystal structure that includes at least 3% cubic phase.

13. An electronic device, comprising:

a first electrode;

a first dielectric layer positioned between the first electrode and a second electrode, the first dielectric layer comprising a layer of boron nitride; and a first diffusion barrier layer positioned between the first electrode and the first dielectric layer, the first diffusion barrier layer comprising a layer of boron and having a thickness sufficient to prevent diffusion between the first electrode and the first dielectric layer, wherein the first electrode is formed of a material with greater conductivity than the first dielectric layer and the second electrode is formed of a material with greater conductivity than the first dielectric layer.

14. An electronic device, comprising:

a first electrode;

a dielectric layer positioned between the first electrode and a second electrode, the dielectric layer comprising a layer of boron nitride; and a diffusion barrier layer positioned between the first electrode and the dielectric layer, the diffusion barrier layer comprising a layer of silicon dioxide, $SiO_2$, having a thickness greater than 10 nanometers, wherein the first electrode is formed of a material with greater conductivity than the dielectric layer and the second electrode is formed of a material with greater conductivity than the dielectric layer.

* * * * *